Figure 4:
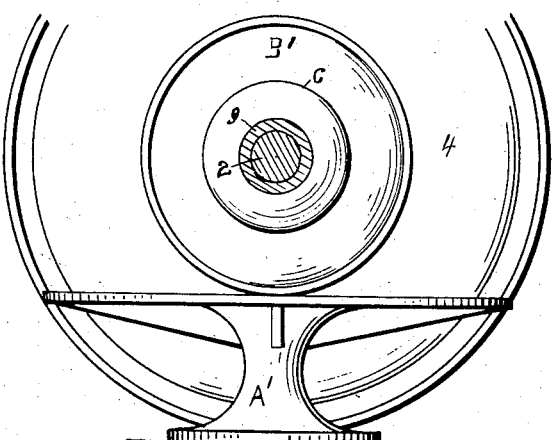

E. J. SWEDLUND.
GEARING.
APPLICATION FILED MAR. 2, 1912.
1,062,128.
Patented May 20, 1913.
4 SHEETS—SHEET 1.
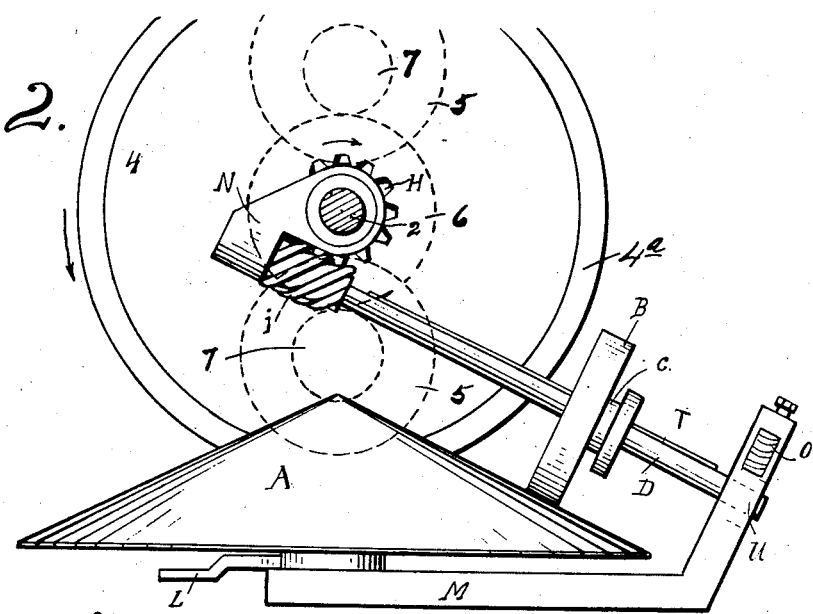
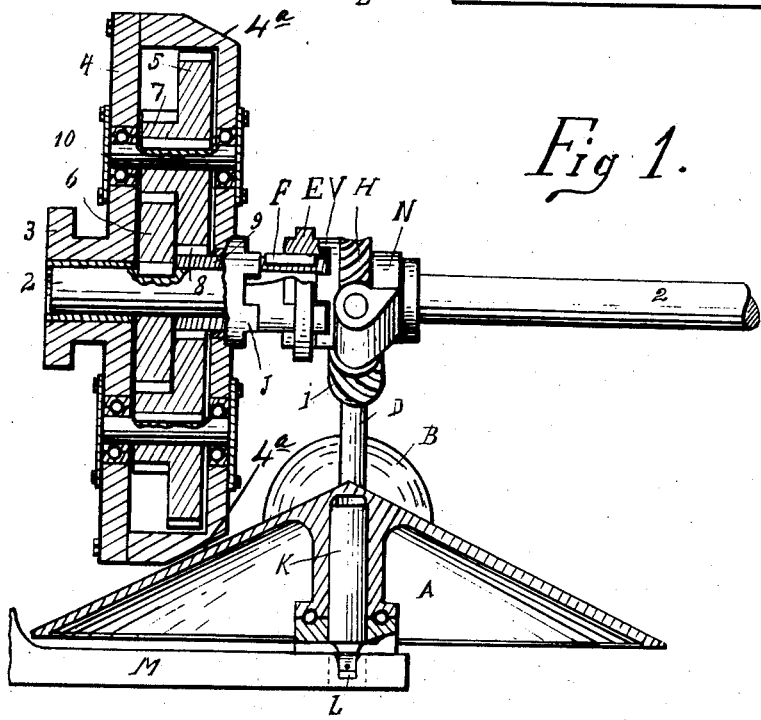
WITNESSES:
INVENTOR.
Erick J. Swedlund.
By E. H. Bond
ATTORNEY.

E. J. SWEDLUND.
GEARING.
APPLICATION FILED MAR. 2, 1912.

1,062,128.

Patented May 20, 1913.
4 SHEETS—SHEET 2.

WITNESSES.

INVENTOR
Erick J. Swedlund,
By
E. H. Bond
ATTORNEY.

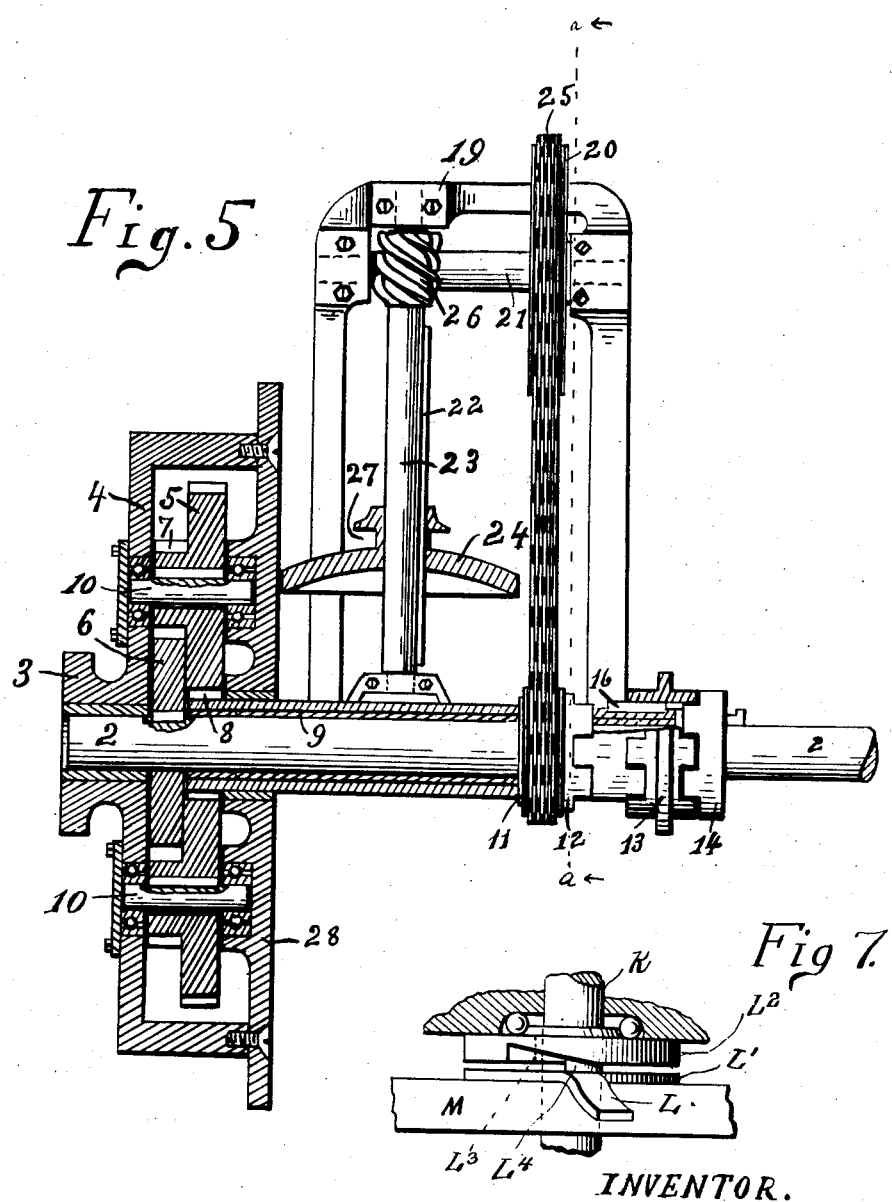

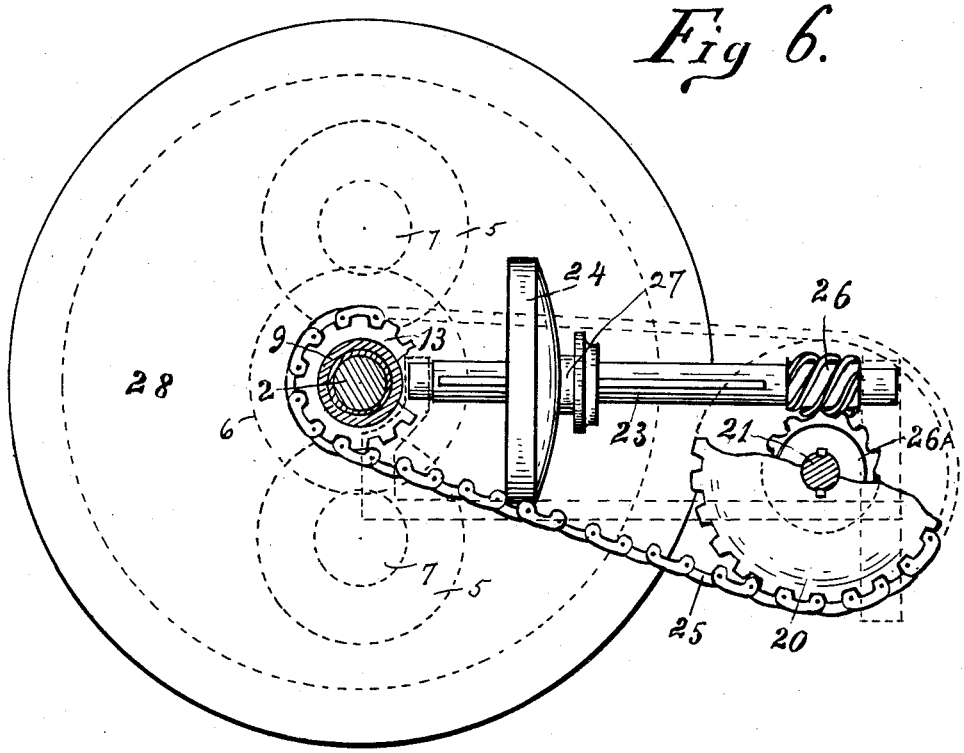

UNITED STATES PATENT OFFICE.

ERICK J. SWEDLUND, OF WILLISTON, NORTH DAKOTA.

GEARING.

1,062,128.   Specification of Letters Patent.   Patented May 20, 1913.

Application filed March 2, 1912. Serial No. 681,116.

*To all whom it may concern:*

Be it known that I, ERICK J. SWEDLUND, a citizen of the United States of America, and resident of Williston, in the county of Williams and State of North Dakota, have invented certain new and useful Improvements in Gearing, of which the following is a specification.

My present invention relates to certain new and useful improvements in gearing of that class designed to be interposed between rotary driving and driven members or bodies and capable of adjustment to render variable at will the speed and power transmitted through it from one member to the other.

The present invention has for its objects among others to provide an improved simplified construction and arrangement of gradually changeable gearing and to combine therewith the flexibility of a friction drive and the positiveness of toothed gearing, and to have a direct drive on the high gearing with no idle gears in motion.

My improvement as hereinafter set forth combines both frictional and toothed gearing, gaining the advantages of both and eliminating the disadvantages of either.

A further object of the invention is to provide gearing that is inexpensive to manufacture, light in weight, compact in form, noiseless in operation, strong and durable and which does away with the necessity of a friction clutch in connection with the gearing.

In my pending application Serial No. 635,008, filed June 23, 1911, I have shown and described a transmission gearing constructed to give three speeds forward and one reverse by planetary gears carried by the driving member and intermeshing with a sun gear carried by the driven member, and also loosely mounted sun gears in connection with brake drums and a clutch member connecting the driving and driven members together to operate as one. In carrying out my present invention, I dispense with such brake drums and the bands coöperating therewith, as well as the friction clutch and one set of planetary and sun gears. A friction clutch is not necessary in a transmission gearing such as constitutes my present invention, where speed can be varied gradually from nothing up to the highest speed.

In my present invention I employ a driving mechanism, a driven mechanism and a controlling mechanism. The former consists of suitable gearing interposed between the driving and driven members to give the latter practically the same speed as the driver when the controlling mechanism is not in operation, and also means for locking the driving and driven members together so as to cause them to rotate as one. The controlling mechanism embodies adjustable friction wheels in coöperative engagement with the driving mechanism and arranged to give a slower rate of speed to the driven member, which may be any speed from the speed of the driver down to neutral or zero, and from zero up to driving speed or higher. The controlling friction wheels are adapted to be moved into or out of engagement with the driving member. When used for controlling the speed, it will be in engagement with the driving member, but when the drive is direct and the driving and driven members rotate together, the controlling mechanism will be out of engagement and hence not in operation.

I aim further at improvements in the details of construction whereby the foregoing ends are brought about in the most approved and economical manner.

Other objects and advantages of the invention will hereinafter appear and the novel features thereof will be particularly pointed out in the appended claims.

The invention is capable of embodiment in a variety of forms, some only of which are herein shown, and those merely for the purpose of illustration, but it is to be understood that the invention is not to be restricted to such particular forms of embodiment.

The invention, in such preferred form, is clearly illustrated in the accompanying drawings, which, with the numerals of reference marked thereon, form a part of this specification, and in which—

Figure 3:
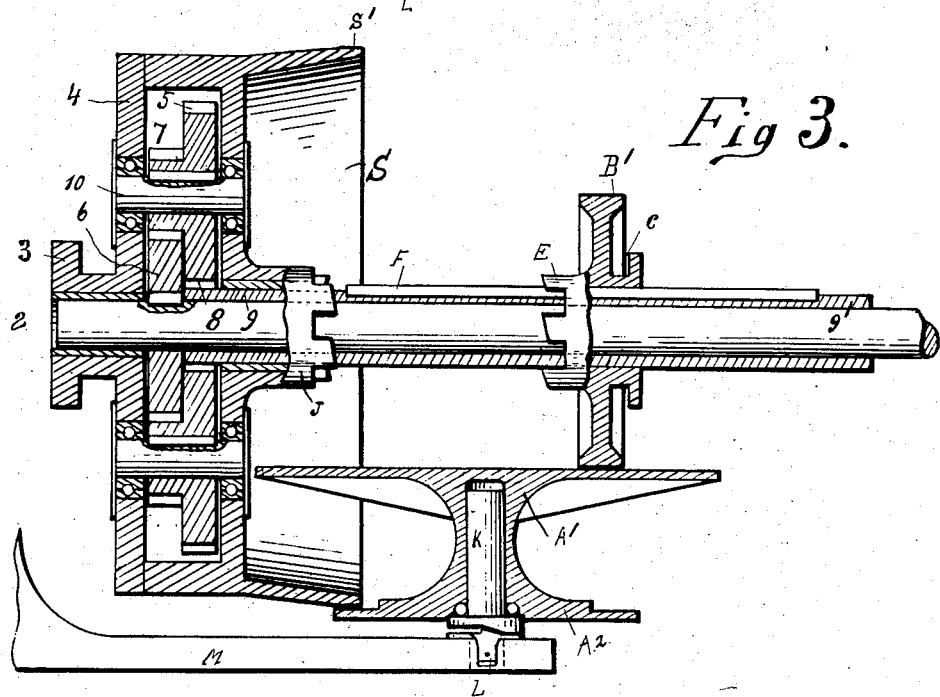

Figure 1 is a longitudinal vertical section with portions broken away and parts in elevation. Fig. 2 is an end elevation with the driven shaft in cross section. Fig. 3 is a substantially central longitudinal vertical section of a modified form with parts broken away and portions in elevation. Fig. 4 is an end elevation of Fig. 3 with the driven member in cross section. Fig. 5 is a substantially central longitudinal section showing a modified form. Fig. 6 is an end view of Fig. 5 with parts broken away and the shafts in section, the section being on the line *a—a* of Fig. 5 looking in the direction of the arrows. Fig. 7 is an enlarged detail view with portions broken away and partly in section showing the elevating mechanism for the friction wheel.

Like characters of reference indicate like parts throughout the different views.

Referring first to Figs. 1 and 2, the numeral 2 designates the driven shaft, 3 being a collar on the gear case 4 which is designed to be coupled directly to the motor shaft and to be driven and rotated at motor speed. By preference, this gear casing 4 is mounted close to the motor and serves as a fly wheel for the latter. One or more sets of planetary gears 5 and 7 is mounted within the casing on shafts 10 and constitute the driving member. The shaft 2 is journaled in said casing and a sun gear 6 is keyed to said shaft and intermeshes with the small planetary gear 7. The sun gear 6 and the shaft 2 constitute the driven member.

A small sun gear 8 is mounted loosely on the driven shaft 2 and intermeshes with the large planetary gear 5. This small sun gear 8 is operatively connected with the controlling mechanism soon to be described.

A is a cone shaped friction wheel mounted on an extension of the motor frame or on a separate base M and adapted to be raised or lowered as by the lever L to make a contact with the gear casing 4, the adjacent face of which is beveled, as seen at 4ª in Fig. 1. B is a friction wheel mounted for contact with the friction wheel A, said friction wheel B being mounted on a shaft D which is disposed parallel with the inclined face of the wheel A, said friction wheel B being free to slide longitudinally on the shaft D but prevented from turning thereon by suitable means as a feather T and having a collar C for engagement by a suitable lever mechanism for moving the wheel on its shaft. This shaft D is journaled in suitable bearings N and U, the latter extending at an angle from the base M, as seen clearly in Fig. 2.

I is a worm fast on the shaft D to rotate therewith near one end, and meshing with a worm gear member H which is loosely mounted on the driven shaft 2.

The gear member H is designed to be connected to the sun gear 8 by means of a clutch E which is slidably mounted upon a hub or sleeve 9 which is, in effect, a part of said gear 8, the said clutch being keyed by feather F or any well-known means so as not to turn on the sleeve. The clutch member E is mounted to slide to engage the coöperating clutch members V and J, the former being a part of the worm gear member H and the latter a part of the gear case 4, as will be clearly understood upon reference to Fig. 1.

The operation is as follows:—Supposing the gear casing 4 to be rotating at motor speed and the clutch member E in engagement with the clutch member J, the gears are thus locked and the casing 4 and the shaft 2 rotate together at motor speed. When a lower speed is desired, the operator engages the controlling mechanism by moving the friction wheel A by means of the lever L into engagement with the gear case 4 and moves the clutch member E so as to engage the clutch member V. The friction wheel B then being in contact with the wheel A and being in a position at the center of said wheel, will give a small reduction of speed to the shaft 2. A gradual reduction of speed from this point down to zero is obtained by sliding the friction wheel B down to the larger diameter of the wheel A. When a certain point is reached where the forward motion of the driving and driven members is neutralized by the backward movement of the sun gear 8, there will be no motion transmitted to the driven shaft 2. If, however, the friction wheel B is moved still farther to the larger diameter of the friction wheel A, a reverse motion will be transmitted to the driven shaft 2.

It will be understood that the power is transmitted from the motor to the driven shaft 2 through the planetary and sun gears. The friction wheels and worm gears control the speed but do not transmit any power; the pressure on the friction wheels is in the same direction as the gear case 4 is rotating, and as this gear case is in frictional engagement with the friction wheel A, the pressure on the friction wheels can be very light, merely enough to rotate the worm gears so as to feed back the pressure from the sun gear 8. There can be no slipping back, for if the friction wheels should stop rotating or lose momentum, the result would be to simply force the driven shaft 2 to rotate faster. Slipping would have to take place in the opposite direction, that is in the same direction that the driving member rotates, which would be impossible, as the worm gear can drive but cannot be driven, and the pressure on the sun gear 8 is held by the worm gears until recoiled or fed back by the friction wheel B. The amount of recoil will be more or less according to the relative diameters of the friction wheels in contact, and this regulates the speed of the friction wheels and the power and speed of the driven shaft or member 2.

As hereinbefore noted, a reverse motion of the driven shaft 2 is obtained by moving the friction wheels into contact on the largest diameter; after the zero point is passed, the reverse motion of the driven shaft will take place. This, however, will be a friction drive; the power will be transmitted by the gear case 4 to the friction wheels A and B, and the worm gears will drive the sun gear 8 backward fast enough to overcome the pressure, and, consequently, the sun gear 8, the worm gears and the friction wheels will become driving as well as controlling means. The friction wheels will be sufficient to transmit the power to reverse the motion to the driven shaft 2 as the gear ratio begins at zero and the friction wheels will be running at high speed on the large diameters of the same.

Referring now to Figs. 3 and 4 in which I have shown a simple modification of the gearing hereinbefore described, the driven and driving members remain the same as before, the controlling mechanism being alone modified. In this form, the controlling of the sun gear 8 is by the double friction wheel A' A² which is in contact upon one side with the gear case 4, the friction wheel B' being slidably mounted on the sleeve 9 of the sun gear and in contact with the face A' of the friction wheel. The friction wheel B' is provided with a collar C for the reception of the operating lever and carries the clutch member E, the coöperating clutch member J being carried by the gear casing 4, as shown. The wheel A'—A² is mounted on a suitable shaft K and is designed to be moved by the lever L.

As will be seen upon reference to Fig. 7, the axle K is rigidly connected to the frame M and does not turn. The collar L', lever L and lug L⁴ are in one piece and are free to turn to either side. The collar L² is keyed to the shaft K L³ but can slide up or down. The friction wheel A² rotates on the stationary shaft K by turning the lever L to the right. The lug L⁴ will raise the collar L² and friction wheel A² so as to engage the gear casing 4 and friction wheel B' and, swinging lever L to the left, will lower the wheel A² and disengage the same.

The side of the gear case adjacent the friction wheel B' is provided with the flange S, the outer face of which is provided with a bearing ring S' with which the face A² of the wheel coacts. In this form, by moving the wheel B' to the largest diameter of the friction wheel surface A', there will be a reverse motion transmitted to the shaft 2, as the speed of the wheel B' and the sun gear 8 will be about three times as fast as the motor speed or the speed of the gear casing 4. By moving the friction wheel B' slowly toward the center of the wheel surface A', the reverse motion of the driven shaft 2 will be slower, and when the zero point is reached there will be no motion at all transmitted to the driven shaft 2. By moving the wheel B' still farther toward the center of the wheel surface A' and past the zero point, the driven shaft 2 will change its rotation to a forward motion, that is in the same direction as the driving gear case 4 is rotating, that the speed of the shaft 2 will be much slower than the gear casing 4. The speed of the shaft 2, however, will be gradually increased as the wheel B' is moved still nearer to the center of the wheel surface A', and if the wheel B' be moved past the center of the wheel surface A', the speed of the shaft 2 will be greater than that of the driving member or gear casing 4, and if the clutch members E and J are brought into engagement with each other, there will be a direct drive and the driving and driven members will rotate together as one.

Any suitable lever mechanism may be provided to move the friction wheel B' on the sleeve 9, said friction wheel being held against rotation on the sleeve by the feather F or other suitable means. At the time the clutch members E and J are in engagement, the lever L will be actuated by the same lever mechanism to disengage the friction wheel surface A² from the bearing surface S' on the flange S of the gear case so that when the gearing is on the direct drive, the controlling mechanism will be out of engagement and idle.

In the construction shown in Figs. 3 and 4, I dispense with the worm gear members H and I shown in Figs. 1 and 2, and for the reason that the friction wheels A' B' are rotating at a higher rate of speed than the motor speed, the slipping, if any, would have to be in the same direction as the rotation of the driving member; hence, any slippage of the friction wheels would not likely take place. The backward pressure of the sun gear 8 is transmitted through the friction wheels back to the driving member 4 and in the same direction of rotation.

The reverse drive in the form shown in Figs. 3 and 4 will be a friction drive, the same as in Figs. 1 and 2, but the drive will be on the large diameters of the friction wheels, and the high speed of the friction wheels, together with the reduction of the gearing and the planetary motion of the gear wheels carried by the drive member, will be sufficient to rotate the driven shaft 2 at slow speed in the opposite direction of the driving member.

In the forms shown in Figs. 5 and 6, the principle of operation is substantially the same as in the other forms hereinbefore specifically described. Referring particularly to said Figs. 5 and 6, it will be noticed that I employ a chain wheel 11 mounted loosely on the sleeve 9 of the small sun gear 8, and another chain wheel 20 mounted on the shaft 21 mounted in suitable bearings on a separate frame 19, 25 being a silent chain connecting these two chain wheels. On this shaft 21 is mounted a worm gear member 26ᴬ, as seen in Fig. 6. This worm gear member is arranged to mesh with a worm 26 mounted on the shaft 23, on which latter shaft 23 a friction wheel 24 is slidably mounted and designed to be operated by a lever similar to the wheel B' shown in Fig. 3 and the wheel B shown in Fig. 2, having a collar 27 for this purpose. This friction wheel 24 is designed to roll in frictional contact with the friction face 28 of the driving member or gear case 4, as seen clearly in Fig. 5. The shafts 21 and 23 are, as above stated, mounted on the frame 19 which is mounted to slide so as to move the friction wheel 24 into and out of engagement or contact with the gear case 4. A clutch member 13 is slidably mounted on the sleeve 9 and when in engagement with the clutch member 12 of the chain wheel 11, the controlling mechanism will be in operation, but when engaging the clutch member 14, the controlling mechanism will not operate and the driving and driven members will be locked and rotate together as one.

As will be seen from Fig. 5, the friction wheel 24 is prevented from turning on its shaft 23 by a feather or the like 22, and the feather 16 serves a like purpose in connection with the clutch member.

From the foregoing, it will be seen that I have devised a simple and efficient form of gearing for the purposes described and while the various structural embodiments of the invention as hereinbefore disclosed are what I at the present time consider preferable, it will be obvious that the same are subject to changes, variations and modifications in detail without departing from the spirit of the invention or sacrificing any of its advantages. I, therefore, do not intend to restrict myself to the exact construction hereinbefore disclosed, but reserve the right to make such changes, variations and modifications as come properly within the scope of the protection prayed.

What is claimed as new is:—

1. In transmission gearing, a driving mechanism embodying a gear case constituting a fly wheel, a driven mechanism, a controlling mechanism embodying a friction wheel in coöperative relation with the driving mechanism, and means for effecting a direct drive to allow the driving and driven mechanisms to rotate as one.

2. In transmission gearing, a driving mechanism embodying a gear case constituting a fly wheel, a driven mechanism, a controlling mechanism embodying an adjustable friction wheel in coöperative relation with the driving mechanism, and means for effecting a direct drive to rotate the driving and driven mechanisms together as one.

3. In transmission gearing, a driving mechanism embodying a gear case constituting a fly wheel, a driven mechanism, a controlling mechanism embodying a friction wheel in coöperative relation with the driving mechanism, and means for effecting a direct drive to allow the driving and driven mechanisms to rotate together as one, said friction wheel being movable out of engagement with the driving mechanism to permit such direct drive.

4. In transmission gearing, a driving mechanism embodying a gear case constituting a fly wheel, a driven mechanism, a controlling mechanism embodying a friction device mounted for engagement with the driving mechanism, and means for effecting a direct drive to allow the driving and driven mechanisms to rotate together as one.

5. In transmission gearing, a driving mechanism embodying a gear case constituting a fly wheel, a driven member, a controlling mechanism embodying a friction device mounted for engagement with the driving mechanism, means for adjusting said friction drive and means for effecting a direct drive to cause the driving and driven mechanisms to rotate together as one.

6. In transmission gearing, a driving mechanism embodying a gear case constituting a fly wheel, a driven mechanism, a controlling mechanism mounted for movement into or out of engagement with the driving mechanism, means for reversing the rotation, and means for effecting a direct drive to allow the driving and driven mechanisms to rotate together as one.

7. In transmission gearing, a driving mechanism embodying a gear case constituting a fly wheel, a driven mechanism, a controlling mechanism having a member mounted for direct frictional engagement with the driving mechanism, and means for effecting a direct drive to allow the driving and driven mechanisms to rotate together as one.

8. In transmission gearing, a driving mechanism embodying a gear case constituting a fly wheel, a driven mechanism, a controlling mechanism having a member mounted for direct frictional engagement with the driving mechanism and adjustable with relation thereto to change the direction of rotation of the driving mechanism, and means for effecting a direct drive to allow the driving and driven mechanisms to rotate together as one.

9. In transmission gearing, a driving mechanism embodying a gear case constituting a fly wheel, a driven mechanism, a controlling mechanism embodying a friction member mounted for direct engagement with the driving mechanism and adjustable with relation thereto for changing the speed as well as the direction of rotation of the driven mechanism, and means for effecting a direct drive to allow the driving and driven mechanisms to rotate together as one.

10. In transmission gearing, a driving mechanism embodying a gear case constituting a fly wheel, a driven mechanism, a controlling mechanism embodying a friction member mounted for direct engagement with the driving mechanism and adjustable with relation thereto for changing the speed as well as the direction of rotation of the driven mechanism, and means for throwing the controlling mechanism out of operative relation and means for effecting a direct drive to allow the driving and driven mechanisms to rotate together as one.

11. In transmission gearing, a driving mechanism embodying a gear case constituting a fly wheel, a driven mechanism, a controlling mechanism operable from the driving mechanism and embodying an element having direct frictional engagement with the driving mechanism, and means for effecting a direct drive to allow the driving and driven mechanisms to rotate together as one.

12. In transmission gearing, a driving mechanism embodying a gear case constituting a fly wheel, a driven mechanism, a controlling mechanism operable from the driving mechanism and embodying an element having direct frictional engagement with the driving mechanism, means for adjusting said element to vary the speed, and means for effecting a direct drive to allow the driving and driven mechanisms to rotate together as one.

13. In transmission gearing, a driving mechanism embodying a gear case constituting a fly wheel, a driven mechanism, a controlling mechanism operable from the driving mechanism and embodying an element having direct frictional engagement with the driving mechanism, means for adjusting said element to change the direction of rotation of the driven mechanism, and means for effecting a direct drive to allow the driving and driven mechanisms to rotate together as one.

14. In transmission gearing, a driving mechanism embodying a gear case constituting a fly wheel, a driven mechanism, a controlling mechanism operable from the driving mechanism and embodying an element having direct frictional engagement with the driving mechanism, means for adjusting said element to change the direction of rotation of the driven mechanism and also the speed thereof, and means for effecting a direct drive to allow the driving and driven mechanism to rotate together as one.

15. In a transmission gearing, a driving mechanism, a driven mechanism, a controlling mechanism embodying an element having direct frictional engagement with the driving mechanism, means for adjusting said element to change the direction of rotation of the driven mechanism and also the speed thereof, and means for providing a direct drive with the controlling mechanism out of engagement and inoperative.

16. In a transmission gearing, driven and driving members, gearing operatively connecting the same, means for effecting a direct drive to allow the driven and driving mechanism to rotate together as one, a sun gear loosely mounted on said driven member and coöperating with said gearing, and a controlling mechanism for rotating said sun gear in either direction for varying the speed and direction of rotation of the driven member.

17. In transmission gearing, a driving mechanism embodying a gear carrier, a driven mechanism, a controlling mechanism embodying a friction wheel in coöperative contact with the driving mechanism, and means for effecting a direct drive to allow the driving and driven mechanism to rotate as one.

18. In transmission gearing, a driving mechanism embodying a gear carrier, a driven mechanism, a controlling mechanism having a member mounted for direct frictional engagement with the driving mechanism, and means for effecting a direct drive to allow the driving and driven mechanisms to rotate together as one.

Signed by me at Williston, N. Dak., this 28th day of February 1912.

ERICK J. SWEDLUND.

Witnesses:
S. R. OTESA,
SUNAUE LESTBY.